United States Patent Office 3,125,589
Patented Mar. 17, 1964

3,125,589
4-CHLORO-6-(HYDROXYAMINO)-1,3-BENZENEDI-
SULFONAMIDES AND INTERMEDIATE
Arthur H. Goldkamp, Glencoe, Ill., assignor to G. D.
Searle & Co., Chicago, Ill., a corporation of Delaware
No Drawing. Filed Mar. 26, 1962, Ser. No. 182,633
2 Claims. (Cl. 260—397.7)

This invention relates to certain 6-(hydroxyamino/nitro)-1,3-benzenedisulfonamides and to intermediates and processes for their manufacture. More particularly, this invention provides novel, useful, and non-obvious chemical compounds of the formula

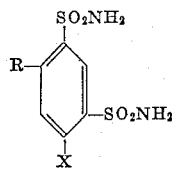

wherein R represents a hydroxyamino (—NHOH) or nitro (—NO$_2$) radical and X represents halogen or a trifluoromethyl radical. Among the halogens (fluorine, chlorine, bromine, and iodine) and trifluoromethyl radical contemplated by X, chlorine is preferred.

The compounds of this invention are useful because of their valuable pharmacological properties. Thus, for example, the hydroxyaminodisulfonamides hereof are potent diuretics; and the nitrodisulfonamides are at once antibacterial, as demonstrated inter alia by their inhibitory effect on the growth of Diplococcus pneumoniae, and anti-inflammatory.

Manufacture of the subject compounds proceeds by heating an appropriate 2,4-dichloro-5-nitrobenzene

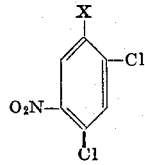

with the sodium or potassium salt of benzyl mercaptan in an inert solvent medium to give the corresponding 2,4-dibenzylthio-5-nitrobenzene which, in turn, is converted to the apposite 2,4-dichlorosulfonyl-5-nitrobenzene by contacting with chlorine in a mixture of acetic acid and acetic anhydride at temperatures of the order of 15–40 degrees and then hydrolyzing. The latter intermediate affords the 6-nitro-1,3-benzenedisulfonamide

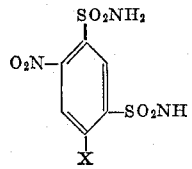

on heating with concentrated ammonium hydroxide. Hydrogenation of the nitrodisulfonamide, using 5% palladium-on-barium-sulfate catalyst in the presence of oxalic acid, provides the corresponding hydroxyamino product. Throughout the foregoing disclosure of preparative procedures, X retains the meaning previously assigned.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. 2,4-Dibenzylthio-1-Chloro-5-Nitrobenzene

To a mixture of 103 parts of 1,2,4-trichloro-5-nitrobenzene, 115 parts of benzyl mercaptan, and 1000 parts of tetrahydrofuran is added, with agitation, 120 parts of aqueous 34% potassium hydroxide. The resultant mixture is heated at the boiling point under reflux in an atmosphere of nitrogen for 4½ hours, then cooled and diluted with 3 volumes of water. The solid precipitate thrown down is filtered off and recrystallized from a mixture of acetone and methanol to give 2,4-dibenzylthio-1-chloro-5-nitrobenzene melting at 124.5–127°.

B. 1-Chloro-2,4-Dichlorosulfonyl-5-Nitrobenzene

A mixture of 410 parts of acetic acid and approximately 14 parts of acetic anhydride is saturated with chlorine by bubbling the gas into the mixture during 20 minutes. The flow of gas is continued while 50 parts of 2,4-dibenzylthio-1-chloro-5-nitrobenzene is added during 6–7 minutes, followed after 20 minutes by 100 parts of water. Heat is evolved, and the reactants are chilled from a maximum of 40° to around 15° with vigorous agitation, at which point introduction of chlorine is stopped and the solid precipitate which forms is filtered off. Washed with a 1:1 mixture of acetic acid and petroleum ether (B.P. 60–71°), and then with petroleum ether alone, the 1-chloro-2,4-dichlorosulfonyl-5-nitrobenzene thus isolated melts at 167–169°.

C. 4-Chloro-6-Nitro-1,3-Benzenedisulfonamide

A mixture of 41 parts of 1-chloro-2,4-dichlorosulfonyl-5-nitrobenzene and 250 parts of concentrated ammonium hydroxide is distilled to dryness at 85–95°. The residue is washed by trituration with cold water, and then with methanol, to give 4-chloro-6-hydroxyamino-1,3-benzenedisulfonamide melting at 277–282°. The product has the formula

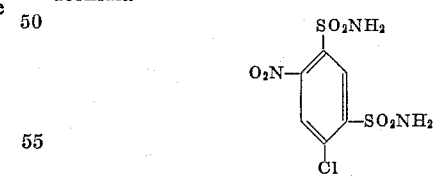

EXAMPLE 2

4-Chloro-6-Hydroxyamino-1,3-Benzenedisulfonamide

A mixture of 48 parts of 4-chloro-6-nitro-1,3-benzenedisulfonamide, 10 parts of oxalic acid, 6 parts of 5% palladium-on-barium-sulfate catalyst, and 2500 parts of ethanol is maintained with vigorous agitation under approximately 2 atmospheres of hydrogen until 2 molecular equivalents of the hydrogen are absorbed. The mixture is then filtered, and the filtrate is freed of solvent by distillation. The residue is crystallized from a mixture of methanol and benzene, and then from water, to give 4-chloro-6-hydroxyamino-1,3-benzenedisulfonamide which decomposes above 190°. The product has the formula

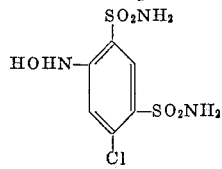

What is claimed is:
1. 4-chloro - 6 - hydroxyamino - 1,3 - benzenedisulfonamide.
2. 2,4-dibenzylthio-1-chloro-5-nitrobenzene.

References Cited in the file of this patent
UNITED STATES PATENTS

| | | |
|---|---|---|
| 2,965,656 | Novello | Dec. 20, 1960 |
| 2,986,573 | Topliss et al. | May 30, 1961 |